US011619538B2

(12) United States Patent
Wei et al.

(10) Patent No.: US 11,619,538 B2
(45) Date of Patent: Apr. 4, 2023

(54) DEVICE FOR CALIBRATING OIL-WATER TWO-PHASE FLOW SENSOR

(71) Applicant: YANGTZE UNIVERSITY, Jingzhou (CN)

(72) Inventors: Yong Wei, Jingzhou (CN); Tao Guo, Jingzhou (CN); XiaoMing Cui, Jingzhou (CN); YiPan Lu, Jingzhou (CN); YuXiang Wang, Jingzhou (CN); LuPing Wang, Jingzhou (CN); Shuang Feng, Jingzhou (CN); Si Lin, Jingzhou (CN)

(73) Assignee: YANGTZE UNIVERSITY, Jingzhou (CN)

( * ) Notice: Subject to any disclaimer, the term of this patent is extended or adjusted under 35 U.S.C. 154(b) by 1 day.

(21) Appl. No.: 17/367,992

(22) Filed: Jul. 6, 2021

(65) Prior Publication Data
US 2022/0381601 A1 Dec. 1, 2022

(30) Foreign Application Priority Data
May 31, 2021 (CN) .......................... 2021106023401

(51) Int. Cl.
*G01F 25/10* (2022.01)
*G01F 1/74* (2006.01)

(52) U.S. Cl.
CPC ................ *G01F 25/10* (2022.01); *G01F 1/74* (2013.01)

(58) Field of Classification Search
CPC .......... G01F 25/10; G01F 25/17; G01F 25/20; G01F 25/00; G01F 25/24; G01F 1/74;
(Continued)

(56) References Cited

U.S. PATENT DOCUMENTS 4,257,895 A * 3/1981 Murdock ........... B01D 17/0211
                                                  210/DIG. 5
5,461,930 A * 10/1995 Farchi ...................... G01F 1/36
                                                        73/195
(Continued)

FOREIGN PATENT DOCUMENTS

CN       1656360 A  *  8/2005  ............. G01F 1/666
CN     104234708 A  *  12/2014
CN     107989596 A  *   5/2018  ............. E21B 47/00

OTHER PUBLICATIONS

Wikipedia Contributors. (May 7, 2021). Flatbed trolley. Wikipedia. Retrieved Aug. 15, 2022, from https://web.archive.org/web/20210507152638/https://en.wikipedia.org/wiki/Flatbed_trolley (Year: 2021).*

*Primary Examiner* — Daniel R Miller
*Assistant Examiner* — Eric Sebastian Von Wald
(74) *Attorney, Agent, or Firm* — WPAT, PC

(57) ABSTRACT

Disclosed is device for calibrating oil-water two-phase flow sensor, the device includes a wellbore model, an oil-water separation mechanism, an oil-water mixing mechanism, an oil inlet mechanism and a water inlet mechanism, the oil-water separation mechanism has a mixture inlet, an oil outlet, and a water outlet. The beneficial effect of the technical scheme proposed in the disclosure is: the oil-water mixture flowing out of the wellbore model is separated by an oil-water separation mechanism, and the separated oil and water are introduced into the oil-water mixing mechanism through an oil inlet mechanism and a water inlet mechanism, respectively, for remixing, the oil-water mixture formed by re-mixing enters the wellbore model, and enters the next cycle, which can realize the reuse of oil and water, the miniaturization of the device, and reduction of the production cost of the device.

8 Claims, 5 Drawing Sheets

(58) Field of Classification Search
CPC ..... G01F 1/76; G01F 1/00; G01F 3/00; G01F 3/24; G01F 3/26; G01F 9/005; G01F 1/002; G01F 1/06; G01F 11/00; G01F 11/28; G01F 11/284; G01F 11/32; G01F 1/6965; G01F 1/696; G01F 1/68; G05D 23/134; G05D 23/132; G05D 23/1306; G05D 23/1353; G05D 23/1366; G05D 23/1373; G05B 2219/39058; G05B 2219/21065; G05B 2219/37008; Y10T 137/00; Y10T 137/8593; Y10T 137/87338; Y10T 137/8737; Y10T 137/4673; Y10T 137/469; Y10T 137/86718; Y10T 137/87265; F15B 2211/40; F15B 2211/40576; F15B 2211/40592; F15B 2211/41

See application file for complete search history.

(56) References Cited

U.S. PATENT DOCUMENTS

| | | | | |
|---|---|---|---|---|
| 6,234,030 | B1 * | 5/2001 | Butler | G01F 15/08 |
| | | | | 73/195 |
| 6,454,002 | B1 * | 9/2002 | Stokes | E21B 43/122 |
| | | | | 166/250.15 |
| 2014/0261803 | A1 * | 9/2014 | Wang | H01L 21/67017 |
| | | | | 137/599.01 |

* cited by examiner

DEVICE FOR CALIBRATING OIL-WATER TWO-PHASE FLOW SENSOR

FIELD OF THE DISCLOSURE

The disclosure relates to device for calibrating oil-water two-phase flow sensor.

BACKGROUND

In the exploitation of oil and gas fields, the monitoring of downhole oil-water two-phase flow can provide information on the production of oil wells, which can help engineers understand the health of the oil well in time, and then adjust the production strategy in time to formulate the optimal production plan. Oil-water two-phase flow is widely researched and applied in the fields of petroleum smelting and chemical industry. For this reason, many types of oil-water two-phase flow sensors have been designed to detect the flow parameters of oil-water two-phase flow. These sensors need to be tested in an oil-water two-phase flow simulation device in the development stage to test their accuracy.

When using the existing oil-water two-phase flow simulation device, it is necessary to configure an oil-water mixture in a certain proportion first, and then pump it into a wellbore model to achieve the calibration of the oil-water two-phase flow sensor that is set in the wellbore model. When you want to change the oil-water mixing ratio of the oil-water mixture pumped into the wellbore model, you need to reconfigure the mixture, which is a cumbersome operation. At the same time, the mixture flowing out of the wellbore model cannot be reused, resulting in a large amount of consumption of water and petroleum during the test, and therefore a large-capacity container is required to store water and petroleum, which makes it difficult to miniaturize the test device, and the production cost of the test device is high.

SUMMARY

In order to solve the technical problems existing in the existing oil-water two-phase flow simulation device, this disclosure provides a device for calibrating oil-water two-phase flow sensor, the device includes a wellbore model, an oil-water separation mechanism, an oil-water mixing mechanism, an oil inlet mechanism, and a water inlet mechanism.

The oil-water separation mechanism has a mixture inlet, an oil outlet and a water outlet, and the mixture inlet communicates with one end of the wellbore model.

The oil-water mixing mechanism has an oil inlet, a water inlet and a mixture outlet, and the mixture outlet communicates with the other end of the wellbore model.

The oil inlet mechanism includes an oil inlet pump, the inlet of the oil inlet pump communicates with the oil outlet, and the outlet of the oil inlet pump communicates with the oil inlet.

The water inlet mechanism includes a water inlet pump, the inlet of the water inlet pump communicates with the water outlet, and the outlet of the water inlet pump communicates with the water inlet.

The beneficial effect of the technical scheme proposed in this disclosure is: the oil-water mixture flowing out of the wellbore model is separated by an oil-water separation mechanism, and the separated oil and water are introduced into the oil-water mixing mechanism through an oil inlet mechanism and a water inlet mechanism, respectively, for remixing, the oil-water mixture formed by re-mixing enters the wellbore model, and enters the next cycle, which can realize the reuse of oil and water, the miniaturization of the device, and reduction of the production cost of the device. At the same time, by changing the ratio of the flow rate of oil and water pumped into the oil-water mixing mechanism by the oil inlet mechanism and the water inlet mechanism, the mixing ratio of the oil-water mixture in the wellbore model can be dynamically adjusted, which is convenient to use.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the figures.

DETAILED DESCRIPTION OF PREFERRED EMBODIMENTS

In order to make the objectives, features, and advantages of this disclosure more obvious and understandable, the technical solutions in the embodiments of this disclosure will be described clearly and completely in conjunction with the accompanying drawings in the embodiments of this disclosure. Obviously, the following described embodiments are only a part of the embodiments of this disclosure, rather than all the embodiments. Based on the embodiments of this disclosure, all other embodiments obtained by those of ordinary skill in the art without creative work shall fall within the protection scope of this disclosure.

Figure 1:
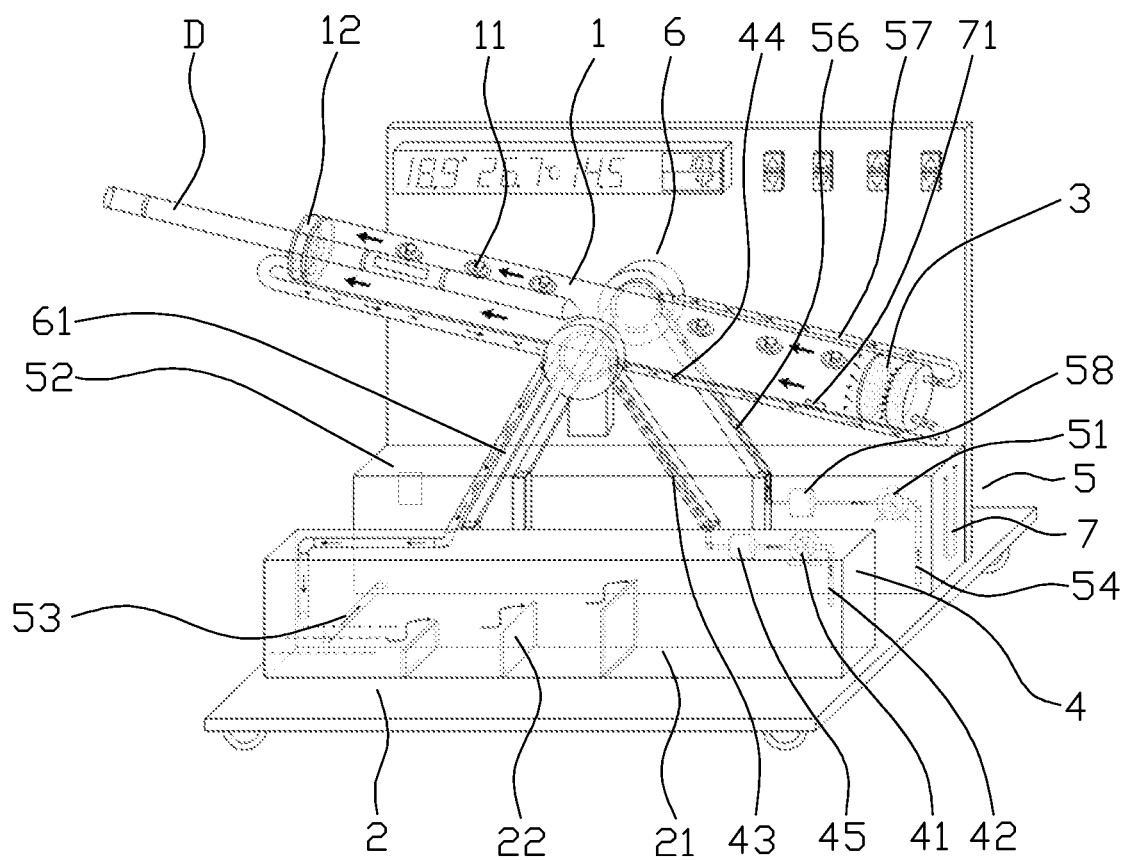
FIG. 1 is a three-dimensional schematic diagram of an embodiment of the device for calibrating oil-water two-phase flow sensor provided by this disclosure.

Please refer to FIG. 1, a three-dimensional schematic diagram of an embodiment of the device for calibrating oil-water two-phase flow sensor provided by this disclosure. The device for calibrating oil-water two-phase flow sensor includes wellbore model 1, oil-water separation mechanism 2, oil-water mixing mechanism 3, oil inlet mechanism 4 and water inlet mechanism 5, among them, wellbore model 1 is used to introduce oil-water mixture with a known flow rate, and wellbore model 1 is equipped with an oil-water two-phase flow sensor. The flow rates of oil and water measured by the sensor is compared with the real values to determine the accuracy of the oil-water two-phase flow sensor. The oil-water separation mechanism 2 is used to separate the oil-water mixture discharged from the wellbore model 1. The oil and water are introduced into the oil-water mixing mechanism 3 through the oil inlet mechanism 4 and the water inlet mechanism 5 respectively, and are remixed into an oil-water mixture in the oil-water mixing mechanism 3 according to a preset ratio, and the oil-water mixture is then introduced into the wellbore model 1, realizing the reuse of oil and water.

The oil-water separation mechanism 2 has a mixture inlet, an oil outlet and a water outlet, and the mixture inlet communicates with one end of the wellbore model 1.

The oil-water mixing mechanism 3 has an oil inlet, a water inlet and a mixture outlet, and the mixture outlet communicates with the other end of the wellbore model 1.

The oil inlet mechanism 4 includes an oil inlet pump 41, the inlet of the oil inlet pump 41 communicates with the oil outlet, and the outlet of the oil inlet pump 41 communicates with the oil inlet.

The water inlet mechanism 5 includes a water inlet pump 51, the inlet of the water inlet pump 51 communicates with the water outlet, and the outlet of the water inlet pump 51 communicates with the water inlet.

When in use, firstly pouring oil and water into the oil-water separation mechanism 2 respectively, the oil enters the oil inlet of the oil-water mixing mechanism 3 through the oil inlet mechanism 4 at a first preset flow rate, and the water enters the water inlet of the oil-water mixing mechanism 3 through the water inlet mechanism 5 at a second preset flow rate, and the oil and water are mixed in the oil-water mixing mechanism 3 to form an oil-water mixture (the mixing ratio of the oil-water mixture can be dynamically adjusted by changing the ratio of the first preset flow rate to the second preset flow rate), and the oil-water mixture enters in the wellbore model 1, after leaving the wellbore model 1, the oil-water mixture then enters in the mixture inlet of the oil-water separation mechanism 2, and then proceeds to the next cycle. At the same time, the oil-water two-phase flow sensors installed in the wellbore model 1 measure the flow rates of oil and water in the oil-water mixture respectively, the measured flow values are compared with the first preset flow rate and the second preset flow rate, so that the accuracy of the flow sensors can be judged.

The beneficial effect of the technical scheme proposed in the disclosure is: The oil-water mixture flowing out of the wellbore model 1 is separated by an oil-water separation mechanism 2, and the separated oil and water are introduced into the oil-water mixing mechanism 3 through an oil inlet mechanism 4 and a water inlet mechanism 5, respectively, for remixing, the oil-water mixture formed by re-mixing enters the wellbore model 1, and enters the next cycle, which can realize the reuse of oil and water, the miniaturization of the device, and reduction of the production cost of the device. At the same time, by changing the ratio of the flow rate of oil and water pumped into the oil-water mixing mechanism 3 by the oil inlet mechanism 4 and the water inlet mechanism 5, the mixing ratio of the oil-water mixture in the wellbore model 1 can be dynamically adjusted, which is convenient to use.

Figure 2:
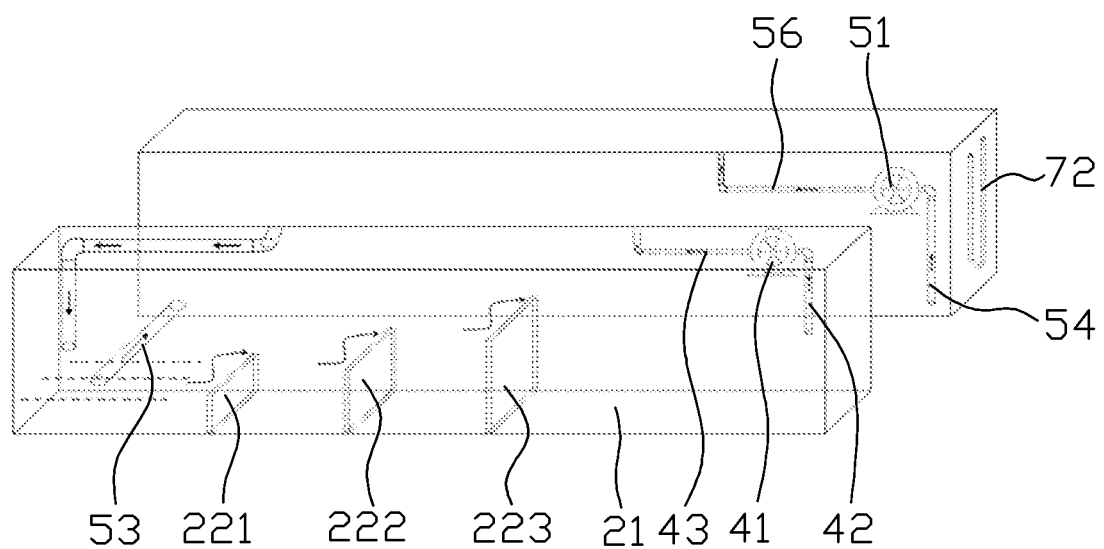
FIG. 2 is a three-dimensional schematic diagram of the oil-water separation mechanism and water storage tank in FIG. 1.
Figure 3:
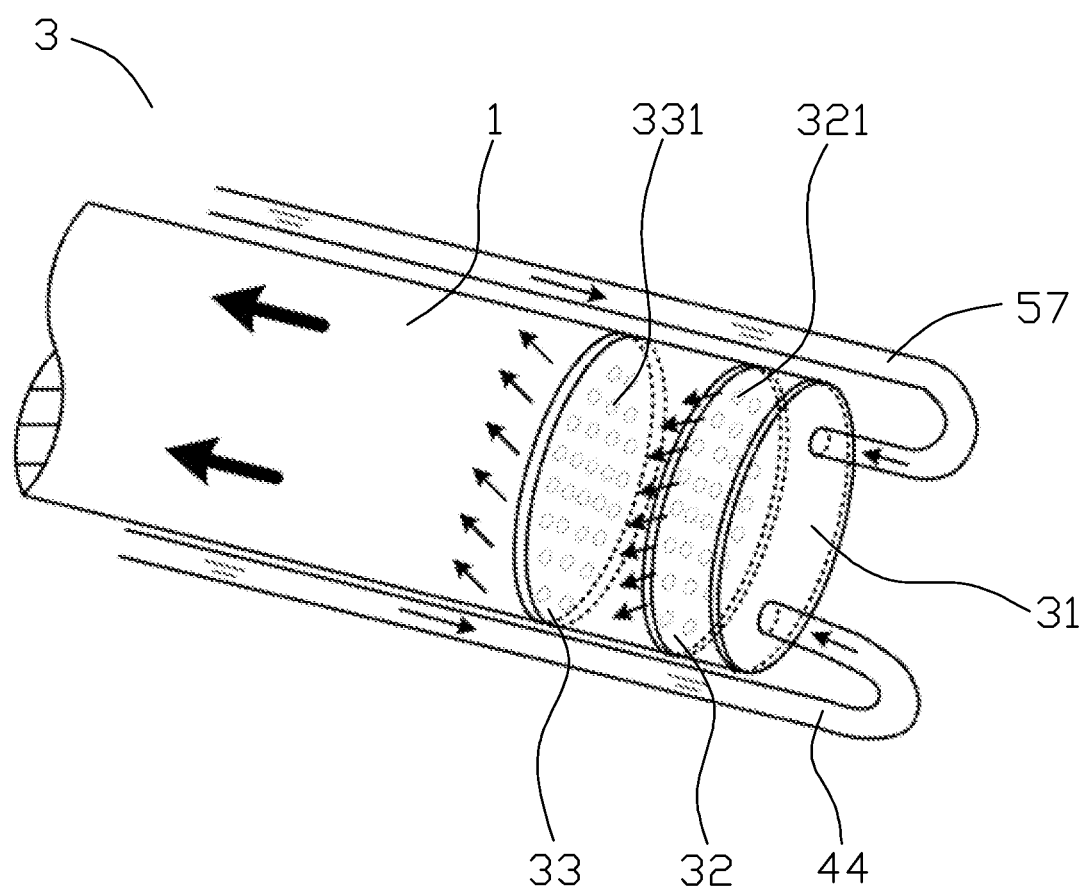
FIG. 3 is a three-dimensional schematic diagram of the oil-water mixing mechanism in FIG. 1.

In order to realize the function of the oil-water separation mechanism 2 specifically, please refer to FIG. 1 and FIG. 2, in a preferred embodiment, the oil-water separation mechanism 2 includes an oil-water separation tank 21 and at least two separation baffles 22, and the separation baffles 22 are sequentially arranged from the first end of the oil-water separation tank 21 to the second end of the oil-water separation tank 21, the height of the separation baffle 22 increases in sequence from the first end of the oil-water separation tank 21 to the second end of the oil-water separation tank 21, an oil-water mixing space is formed between the separation baffle 22 with the lowest height and the end surface corresponding to the first end of the oil-water separation tank 21, and a water collection space is formed between the separation baffle 22 with the highest height and the end surface corresponding to the second end of the oil-water separation tank 21. The water inlet mechanism 5 further includes a water storage tank 52, a connecting pipe 53, and a first water inlet pipe 54, one end of the connecting pipe 53 is connected to the lower end of the oil-water mixing space, and the other end of the connecting pipe 53 is connected to the water storage tank 52, one end of the first water inlet pipe 54 is connected to the water storage tank 52, and the other end of the first water inlet pipe 54 is connected to the inlet of the water inlet pump 51. The oil inlet mechanism 4 further includes a first oil inlet pipe 42, one end of the first oil inlet pipe 42 communicates with the upper end of the water collection space, and the other end of the first oil inlet pipe 42 communicates with the inlet of the oil inlet pump 41.

Please continue to refer to FIG. 1 and FIG. 2, in this embodiment, the number of separation baffles 22 is three. The heights of the three separation baffles 22 are ¼ of the box height, ½ of the box height, and ⅔ of the box height respectively, and the three separation baffles 22 are named with first separation baffle 221, second separation baffle 222, and third separation baffle 223 respectively. The oil-water mixture first reaches the left side of the first separation baffle 221, because of the effect of gravity and the difference in density, the water will settle below the mixture and flow into the water storage tank 52 through the connecting pipe 53. Most of the water and a very small part of the oil will flow into the water storage tank 52 through the connecting pipe 53, and the stratified flow will continue in the water storage tank 52, but because the first water inlet pipe 54 is located at the far right of the water storage tank 52, and the height of the inlet of the first water inlet pipe 54 is at ¹⁄₁₀ of the height of the water storage tank 52, which ensures that the liquid sucked into the first water inlet pipe 54 is pure water. The oil in the mixed liquid will float above the mixed liquid. After the liquid level of the oil-water mixed liquid exceeds the height of the first separation baffle 221, most of the oil and a small part of the water will flow into the space between the first separation baffle 221 and the second separation baffle 222. Due to the buffering effect of the first separation baffle 221, the oil-water mixture is relatively static in this space at this time, which facilitates the separation of oil and water, and the oil-water separation effect is better than the left side of the first separation baffle 221. Similarly, the oil-water mixture is further stratified after crossing the second separation baffle 222 and the third separation baffle 223, and the liquid left on the right side of the third separation baffle 223 is almost all oil, which ensures that the liquid sucked into the first oil inlet pipe 42 is pure oil, to achieve oil-water separation.

In order to realize the function of the oil-water mixing mechanism 3 specifically, please refer to FIG. 1, in a preferred embodiment, the oil-water mixing mechanism 3 includes a first bottom plate 31, a first spray plate 32, and a second spray plate 33, the first bottom plate 31, the first spray plate 32, and the second spray plate 33 are sequentially embedded in the wellbore model 1, a plurality of first spray holes 321 are formed on the first spray plate 32, a first mixing cavity is formed between the first spray plate 32 and the first bottom plate 31, the first mixing cavity communicates with the outlet of the water inlet pump 51 and the outlet of the oil inlet pump 41, a plurality of second spray holes 331 are formed on the second spray plate 33, and a second mixing cavity is formed between the second spray plate 33 and the first spray plate 32. In this embodiment, the first spray holes 321 and the second spray holes 331 are both arrayed oblique holes. When in use, the water inlet pump 51 and the oil inlet pump 41 pump water and oil into the first mixing cavity respectively. Mixing occurs in the first mixing cavity, and then after passing through the first spray hole 321, the mixed liquid is dispersed and atomized, and enters the second mixing cavity, where it is further mixed, and finally passes through the second spray hole 331, where it is dispersion and atomization again, after two times of dispersion and atomization, a relatively uniform oil-water mixture can be obtained.

In order to simulate the two-phase flow in an inclined well, please refer to FIG. 1, in a preferred embodiment, the device further includes an angle adjustment mechanism 6, the angle adjustment mechanism 6 includes a support rod 61 and a driver 62, the wellbore model 1 is rotatably arranged on the support rod 61 via a rotating shaft, the driver 62 is connected to the wellbore model 1 and is used to drive the wellbore model 1 to rotate.

Figure 4:
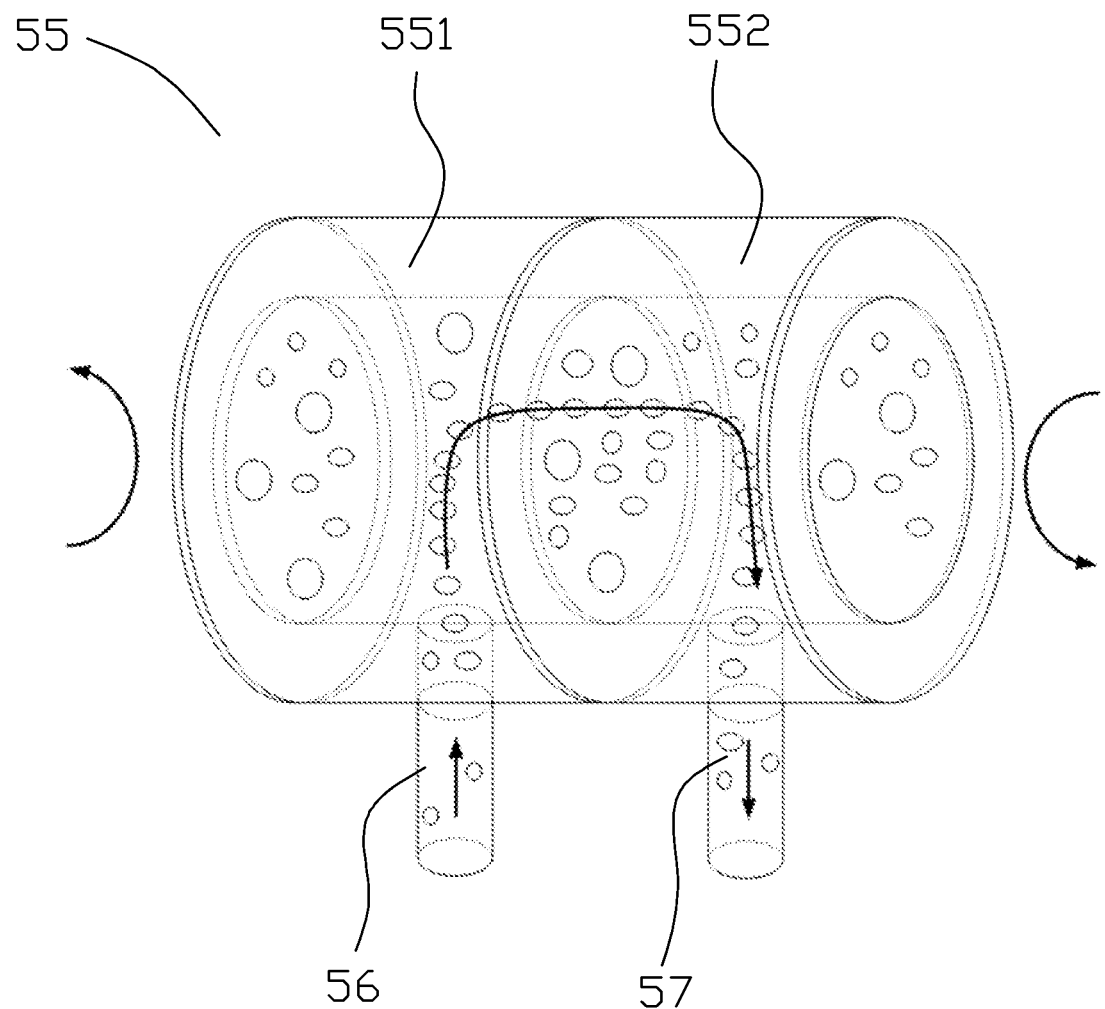
FIG. 4 is a three-dimensional schematic diagram of the first dynamic seal in FIG. 1.

In order to prevent the pipe from being kinked or bent and damaged due to the rotation of the wellbore model 1, please refer to FIG. 1 and FIG. 4, in a preferred embodiment, the water inlet mechanism 5 further includes a first dynamic seal 55, a second inlet pipe 56, and a third inlet pipe 57, the first dynamic seal 55 includes a first left cylinder 551 and a first right cylinder 552, the first left cylinder 551 has a first left accommodating cavity, the first right cylinder 552 and the first left cylinder 551 are sealed and rotatably connected, the first right cylinder 552 has a first right accommodating cavity communicating with the first left accommodating cavity, and one end of the second inlet pipe 56 communicates with the first left accommodating cavity, the other end of the second inlet pipe 56 communicates with the outlet of the water inlet pump 51, one end of the third inlet pipe 57 communicates with the first right accommodating cavity, and the other end of the third inlet pipe 57 communicates with the first mixing cavity.

In order to prevent the pipe from being kinked or bent and damaged due to the rotation of the wellbore model 1, please refer to FIG. 1, in a preferred embodiment, the oil inlet mechanism 4 also includes a second dynamic seal, a second oil inlet pipe 43 and a third oil inlet pipe 44. The second dynamic seal includes a second left cylinder and a second right cylinder. The second left cylinder has a second left accommodating cavity, the second right cylinder is sealed and rotatably connected with the second left cylinder, the second right cylinder has a second right accommodating cavity communicating with the second left accommodating cavity, one end of the second oil inlet pipe 43 communicates with the second left accommodating cavity, the other end of the second oil inlet pipe 43 communicates with the outlet of the oil inlet pump 41. One end of the third oil inlet pipe 44 communicates with the second right accommodating cavity, and the other end of the third oil inlet pipe 44 communicates with the first mixing cavity. When the wellbore model 1 rotates, the second right cylinder is connected to the second right accommodating cavity. When the left cylinder rotates, there will be no kinks or bends between the second oil inlet pipe 43 and the third oil inlet pipe 44, which can prevent the second oil inlet pipe 43 and the third oil inlet pipe 44 from being damaged due to kinks or bends, which can improve the stability of the device.

In order to facilitate the acquisition of the true flow rate of the oil phase, please refer to FIG. 1, in a preferred embodiment, the oil inlet mechanism 4 also includes an oil measuring flow meter 45, which is installed on the first oil inlet pipe 42 and is used to measure the flow rate of oil in the second inlet pipe 56.

In order to facilitate the acquisition of the true flow rate of the water phase, please refer to FIG. 1, in a preferred embodiment, the water inlet mechanism 5 also includes a water measuring flow meter 58, which is installed on the first water inlet pipe 54 and is used to measure the flow rate of water in the first water inlet pipe 54.

Figure 5:
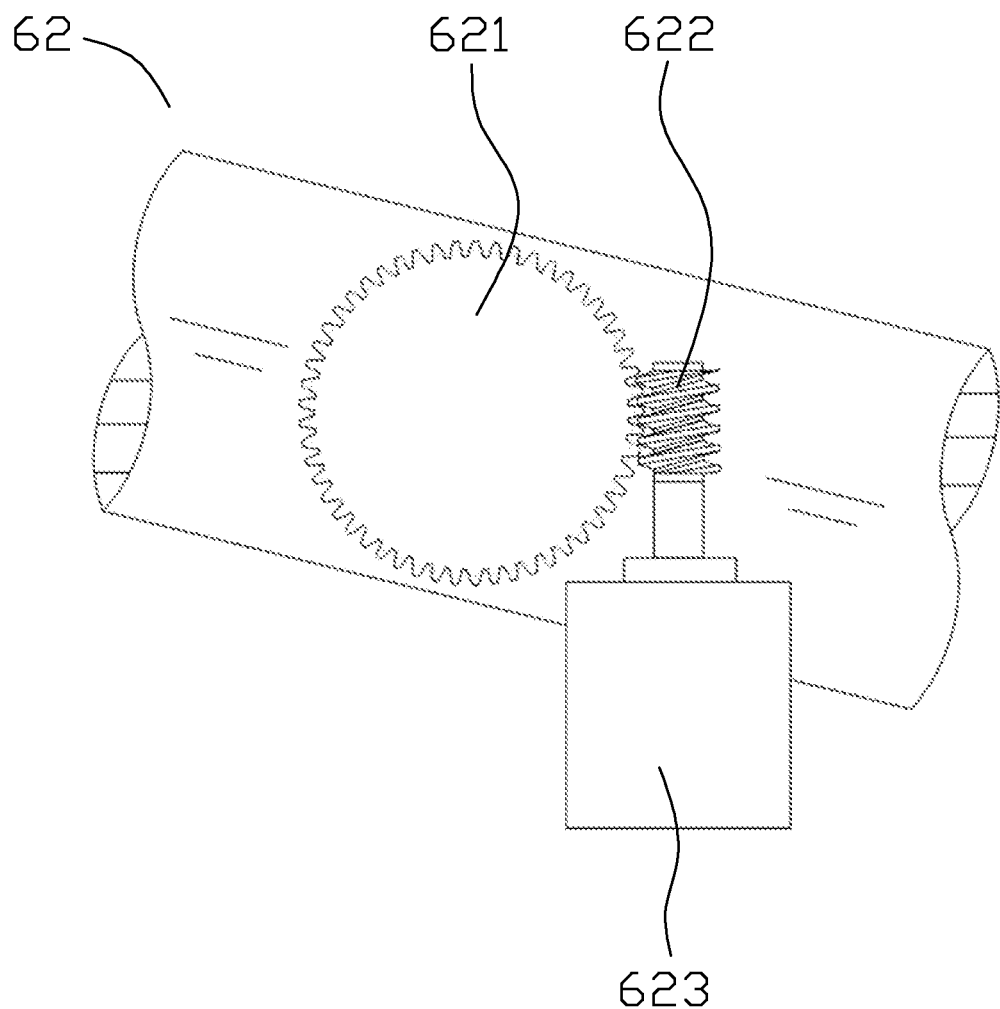
FIG. 5 is a three-dimensional schematic diagram of the driver in FIG. 1.

In order to realize the function of the driver 62 specifically, please refer to FIG. 1 and FIG. 5, in a preferred embodiment, the driver 62 includes a worm gear 621, a worm 622, and a stepper motor 623, the worm gear 621 is fixed on the wellbore model 1, the worm 622 is meshed with the worm gear 621, and the stepper motor 623 is connected to the worm 622 and is used to drive the worm 622 to rotate. When in use, by controlling the forward and reverse rotation of stepper motor 623, the tilt angle of wellbore model 1 can be adjusted. In this embodiment, the model of stepper motor 623 is 57-stepper motor, and its step angle can reach 1.8°. After the deceleration of worm 622 and worm gear 621, the inclination angle of wellbore model 1 can easily reach an accuracy of 0.01°, so t his device has the advantages of stable operation, high angle adjustment accuracy, and self-locking.

In order to make the temperature of the mixed liquid in the wellbore model 1 match the actual downhole temperature, please refer to FIG. 1 and FIG. 2, in a preferred embodiment, the device also includes a temperature adjustment mechanism 7, the temperature adjustment mechanism 7 includes a temperature sensor 71 and a heater 72, the temperature sensor 71 is set in the wellbore model 1, and the heater 72 is set in the water storage tank 52. The heater 72 increases the water temperature in the water storage tank 52, so that the temperature of the mixed liquid in the wellbore model 1 is consistent with the actual downhole temperature to better calibrate oil-water two-phase flow sensors.

In order to facilitate the installation of a separate oil-water two-phase flow sensor on the wellbore model 1, please refer to FIG. 1, in a preferred embodiment, a plurality of mounting holes 11 are formed on the side wall of the wellbore model 1, and the mounting holes 11 are used for fixed installation of oil-water two-phase flow sensors.

In order to install a measuring instrument D with oil-water two-phase flow sensors in the wellbore model 1, please refer to FIG. 1, in a preferred embodiment, a second bottom plate 12 is set at one end of the wellbore model 1 away from the first bottom plate 31, and a fixing hole for fixing a measuring instrument D is formed on the second bottom plate 12. When in use, if a flow sensor has already been installed on the skeleton of a measuring instrument D, and you want to calibrate the flow sensor on the measuring instrument D as a whole, you need to fix the measuring instrument D on the second bottom plate 12 and extend it into the wellbore model 1.

In order to facilitate the movement of the entire device, please refer to FIG. 1, in a preferred embodiment, the device further includes a bearing plate 8 and a roller 9, the oil-water separation tank 21 and the water storage tank 52 are both fixed on the bearing plate 8, and the roller 9 is arranged at the lower end of the bearing plate 8.

In order to better understand this disclosure, the working process of the device for calibrating oil-water two-phase flow sensor provided by this disclosure will be described in detail below in conjunction with FIG. 1 to FIG. 5: firstly, pouring oil and water into the oil-water separation tank 21 and the water storage tank 52 respectively. The oil enters the space between the first bottom plate 31 and the first spray plate 32 through first oil inlet pipe 42, oil inlet pump 41, second oil inlet pipe 43 and third oil inlet pipe 44. Water enters the space between the first bottom plate 31 and the first spray plate 32 through the first water inlet pipe 54, the water inlet pump 51, the second inlet pipe 56 and the third inlet pipe 57. The oil and water are mixed in the oil-water mixing mechanism 3 to form an oil-water mixture, The oil-water mixture enters the wellbore model 1, and the oil-water mixture leaves the wellbore model 1 and then enters the left side of the first separation baffle 221 in the oil-water separation tank 21, where the oil and water are stratified, and the water in the lower layer enters the water storage tank 52 through the connecting pipe 53, and then enters the next cycle. The oil in the upper layer is further purified by the second separation baffle 222 and the third separation baffle 223, and finally enters the next cycle through the first oil inlet pipe 42. At the same time, the oil-water two-phase flow sensors installed in the wellbore model 1 measures the flow rates of the oil and water phases respectively in the oil-water mixture, the measured flow rate values are compared with the actual flow rate values, so that the accuracy of the flow sensors can be judged It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. Device for calibrating oil-water two-phase flow sensor, comprising a wellbore model, an oil-water separation mechanism, an oil-water mixing mechanism, an oil inlet mechanism, and a water inlet mechanism, wherein:
    the oil-water separation mechanism has a mixture inlet, an oil outlet and a water outlet, and the mixture inlet communicates with one end of the wellbore model;
    the oil-water mixing mechanism has an oil inlet and a mixture outlet, and the mixture outlet communicates with the other end of the wellbore model;
    the oil inlet mechanism includes an oil inlet pump, an inlet of the oil inlet pump communicates with the oil outlet, and an outlet of the oil inlet pump communicates with the oil inlet;
    the water inlet mechanism includes a water inlet pump, an inlet of the water inlet pump communicates with the water outlet, and an outlet of the water inlet pump communicates with the water inlet;
    the oil-water mixing mechanism includes a first bottom plate, a first spray plate, and a second spray plate, the first bottom plate, the first spray plate, and the second spray plate are sequentially embedded in the wellbore model, a plurality of first spray holes are formed on the first spray plate, a first mixing cavity is formed between the first spray plate and the first bottom plate, the first mixing cavity communicates with the outlet of the water inlet pump and the outlet of the oil inlet pump, a plurality of second spray holes are formed on the second spray plate, and a second mixing cavity is formed between the second spray plate and the first spray plate;
    wherein the device further includes a second bottom plate that is set at one end of the wellbore model away from the first bottom plate, and a fixing hole for fixing a measuring instrument is formed on the second bottom plate.

2. The device for calibrating oil-water two-phase flow sensor according to claim 1, wherein:
    the oil-water separation mechanism includes an oil-water separation tank and at least two separation baffles, and the separation baffles are sequentially arranged from a first end of the oil-water separation tank to a second end of the oil-water separation tank, a height of the separation baffle increases in sequence from the first end of the oil-water separation tank to the second end of the oil-water separation tank, an oil-water mixing space is formed between the separation baffle with the lowest height and an end surface corresponding to the first end of the oil-water separation tank, and a water collection space is formed between the separation baffle with the highest height and an end surface corresponding to the second end of the oil-water separation tank;
    the water inlet mechanism further includes a water storage tank, a connecting pipe, and a first water inlet pipe, one end of the connecting pipe is connected to the lower end of the oil-water mixing space, and the other end of the connecting pipe is connected to the water storage tank, one end of the first water inlet pipe is connected to the water storage tank, and the other end of the first water inlet pipe is connected to the inlet of the water inlet pump;
    the oil inlet mechanism further includes a first oil inlet pipe, one end of the first oil inlet pipe communicates with an upper end of the water collection space, and the other end of the first oil inlet pipe communicates with the inlet of the oil inlet pump.

3. The device for calibrating oil-water two-phase flow sensor according to claim 1, wherein the device further includes an angle adjustment mechanism, the angle adjustment mechanism includes a support rod and a driver, the wellbore model is rotatably arranged on the support rod via a rotating shaft, the driver is connected to the wellbore model and is used to drive the wellbore model to rotate.

4. The device for calibrating oil-water two-phase flow sensor according to claim 3, wherein the water inlet mechanism further includes a first dynamic seal, a second inlet pipe, and a third inlet pipe, the first dynamic seal includes a first left cylinder and a first right cylinder, the first left cylinder has a first left accommodating cavity, the first right cylinder and the first left cylinder are sealed and rotatably connected, the first right cylinder has a first right accommodating cavity communicating with the first left accommodating cavity, and one end of the second inlet pipe communicates with the first left accommodating cavity, the other end of the second inlet pipe communicates with the outlet of the water inlet pump, one end of the third inlet pipe communicates with the first right accommodating cavity, and the other end of the third inlet pipe communicates with the first mixing cavity.

5. The device for calibrating oil-water two-phase flow sensor according to claim 3, wherein the driver includes a worm gear, a worm, and a stepper motor, the worm gear is fixed on the wellbore model, the worm is meshed with the worm gear, and the stepper motor is connected to the worm and is used to drive the worm to rotate.

6. The device for calibrating oil-water two-phase flow sensor according to claim 2, wherein the device also includes a temperature adjustment mechanism, the temperature adjustment mechanism includes a temperature sensor and a heater, the temperature sensor is set in the wellbore model, and the heater is set in the water storage tank.

7. The device for calibrating oil-water two-phase flow sensor according to claim 1, wherein a plurality of mounting holes are formed on a side wall of the wellbore model, and the mounting holes are used for fixed installation of oil-water two-phase flow sensors.

8. The device for calibrating oil-water two-phase flow sensor according to claim 2, wherein the device further includes a bearing plate and a roller, the oil-water separation tank and the water storage tank are both fixed on the bearing plate, and the roller is arranged at a lower end of the bearing plate.

* * * * *